United States Patent [19]

Camp

[11] Patent Number: 4,694,760
[45] Date of Patent: Sep. 22, 1987

[54] STANDING SEED PLANTER

[76] Inventor: Joan A. Camp, 1798 Belmar Blvd., Wall, N.J. 07719

[21] Appl. No.: 793,751

[22] Filed: Nov. 1, 1985

[51] Int. Cl.$^4$ .............................................. A01C 5/02
[52] U.S. Cl. ...................................... 111/92; 294/50.8
[58] Field of Search .................. 172/92, 99; 294/50.8, 294/50.7, 50.6

[56] References Cited

U.S. PATENT DOCUMENTS

| | | | |
|---|---|---|---|
| 960,113 | 5/1910 | Rumble | 294/50.8 X |
| 1,077,822 | 11/1913 | Engleman | 111/92 |
| 1,153,225 | 9/1915 | Himebaugh | 111/92 |
| 1,296,771 | 3/1919 | Dady | 111/92 |
| 2,149,880 | 3/1939 | Boordsen | 111/92 |

*Primary Examiner*—Richard J. Johnson
*Attorney, Agent, or Firm*—Charles F. Gunderson

[57] ABSTRACT

An elongated device for planting seeds from an upright or standing position, or from a wheel chair, having an elongated hollow tube open at its upper end and closed at its lower end by a lower portion that is pointed, and that can be pushed into the ground to any desired depth. The upper end includes a handle having a rigid part secured around the open end, for pushing down the hollow tube to push the pointed lower portion into the ground to the desired depth. The pointed lower portion has sections hinged to the hollow tube and controlled by lever arms to push aside the ground while opening the lower end of the hollow tube. The handle also includes a movable part that is mechanically coupled to the lever arm or arms of the hinged sections of the openable lower portion to spread the lower portion for the planting of a seed or other plant form into the ground. The seed or seeds may be dropped into the open upper end before or after the lower end is opened, and water, for germination of the seed, as well as fertilizer or other materials to improve the plants growth may also be added, directly to the seed, through the hollow tube.

3 Claims, 5 Drawing Figures

STANDING SEED PLANTER

BACKGROUND OF THE INVENTION

There are many planting devices on the market for assisting one in planting various kinds of seeds. Aside from the mechanical and automatic devices for mass planting, on huge farms, there is a need for devices to help the very, very many amateur gardeners of small plots who derive enormous satisfaction from their gardens—and, indeed, may rely on them for supplemental food.

There are some devices for small gardens and for planting individual seeds. However, most of these are designed for planting seeds from a stooped or kneeling position. These are effective, but make planting relatively slow and tedious, and do not take into account a large group of people, including the elderly and disabled—and for whom gardening could be an important outlet and therapy—who have trouble bending or kneeling. This would also include people in wheel chairs, who cannot plant seeds at all in the normal manner. And, even active gardeners, who can bend and kneel, can become fatigued by planting large numbers of seeds from a kneeling or stooping position.

There is, therefore, a need for a device that can plant a variety of types of seeds, singly or in clusters, at any desired depth, at a precise location, or even move seedlings from one location to another, at the proper stage in their development, all from a relatively relaxed and comfortable standing position. Of equal importance is to provide a simple device, easily stored and handled, and easy to use for a variety of purposes.

In addition to planting a seed or seeds at a precise location and depth, it is essential to water the seeds or seedlings as soon as possible, and sometimes to provide certain types and amounts of chemicals or fertilizer to improve the germination and growth of the seeds. This usually requires a second tour around the newly-seeded plot to water the ground and add the desired supplements of fertilizer.

In this case the water must sink down through the earth to, hopefully, reach each individual seed eventually. The fertilizing material may take even longer to sink into the ground and reach the seed. While the seed needs only a little water and maybe some fertilizer to germinate, a lot or water and fertilizer must be spread around the planted seeds to make sure that at least the little water and fertilizing agents reach the seed. While this is usually successful, it is inevitably haphazard, and inefficient in comparison with the system taught here.

There is, therefore, also a need for a system or device that can not only plant a seed, but add a precise amount of water, fertilizer—or other supplementary agents—directly to the seed itself when and where it is planted, leaving no delays and nothing to chance.

It is therefore an object of this invention to provide a planting and soil controlling device that can be used from a standing position, or an elevated position, as from a wheel chair. It is a further object of this invention to provide a simple, elongated device that can be pushed into the ground at any desired place to inject a seed into the ground at a given depth. It is a further object of this invention to provide a device that can apply a given, minimal, amount of water and fertilizer, as well as materials such as humus, vermiculite, or top soil, directly in contact with each individual seed to facilitate its germination and growth. It is a further object of this device to provide a planting device that is easily handled, easily cleaned, and easily stored, and that can plant seeds individually or in clusters at any given depth.

SUMMARY OF THE INVENTION

A planter for individual seeds, or clusters of seeds, or seedlings, has an elongated, hollow, tubular structure with a handle at its upper end and a cone-shaped, soil-penetrating section at its lower end. A rigid portion of the handle serves to push down the tubular structure and force the cone into the ground. The cone-shaped bottom section is hinged to be openable for the injection of seeds, etc., through the hollow tubular structure, into the ground.

A moveable part of the handle is connected to the bottom cone, or cones, to open the cones when the handle is squeezed to spread the earth so that a seed, or any supplementary material, such as mulch, fertilizer, and, of course, water can be dropped down the tube directly into the earth at any desired depth, directly in contact with the seed. This device may also be used to pick up a seedling, and replant it in a pre-punched hole at another location.

DETAILED DESCRIPTION OF THE DRAWINGS

Figures 1, 5:
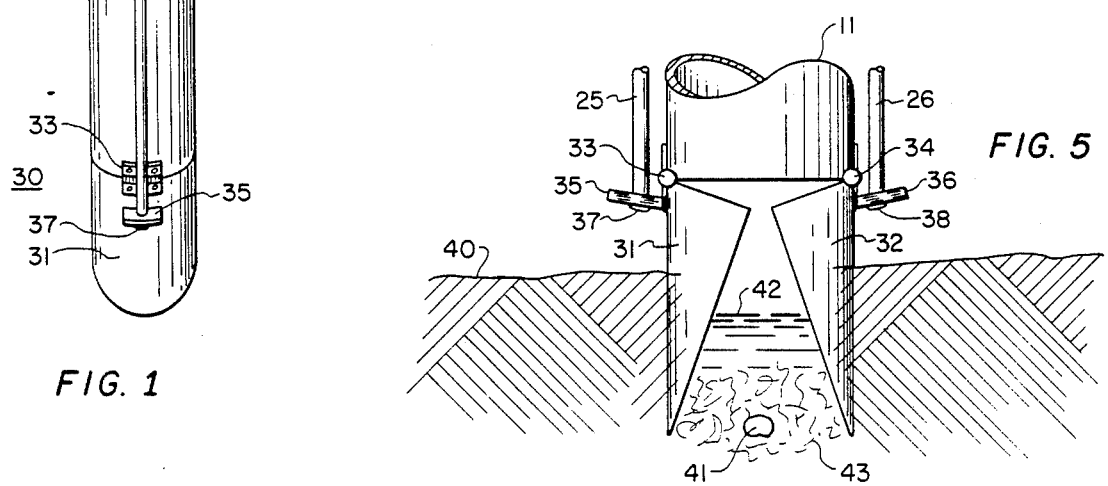
FIG. 1 shows an isometric view of the overall planter.
FIG. 5 shows an enlarged front view of the lower portion of the planter open.

Referring now more particularly to FIG. 1, an isometric view of the overall planter 10 is shown with an upper handle portion, and a lower, ground-penetrating conical portion 30. The handle portion has a rigid part 21, secured to the upper portion or the tube 11, and a movable part 22 hinged at 23 to the rigid part 21. A spring 24 holds the handle parts in an open position, seen also in FIG. 2. The lower end of the body portion or tube 11 holds a conical part 30 to be pushed into the ground.

A control rod 25 is attached to the movable handle part 22. The control rod 25 extends down to the conical portion 30 and is connected to a lever arm 35, on one of the conical sections 31, by a nut or other means 37 to be opened by the raising of control rod 25 by the movable part of the handle, as seen in FIGS. 4 and 5.

Figure 2:
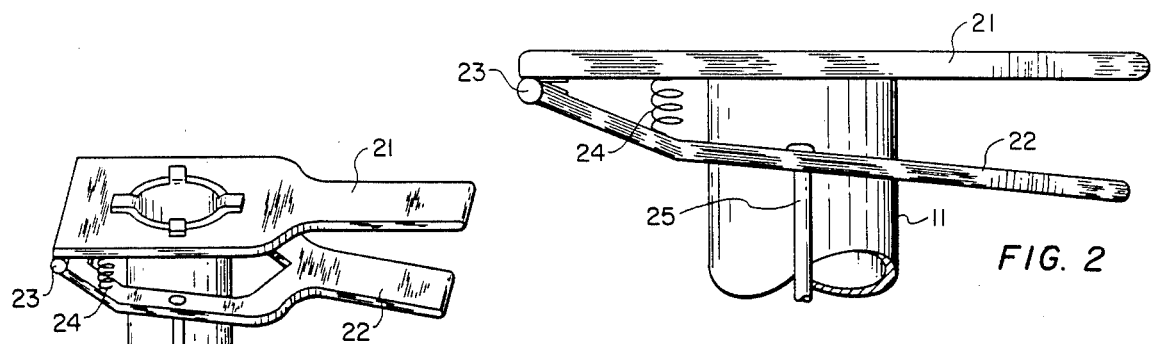
FIG. 2 shows an enlarged, side view of the upper handle portion of the planter at rest.

FIG. 2 shows a side view of the upper handle portion at rest, when the device is not actuated. Similar elements are similarly numbered. Here the rigid part of the handle 21 is seen attached to the tubular body 11, and the movable handle part 22 is attached to the rigid handle part at the hinge 23. A spring 24 is provided to hold the handle parts in an open position, at rest, which hold the lower conical portions closed, as seen in FIG. 3.

Figure 3:
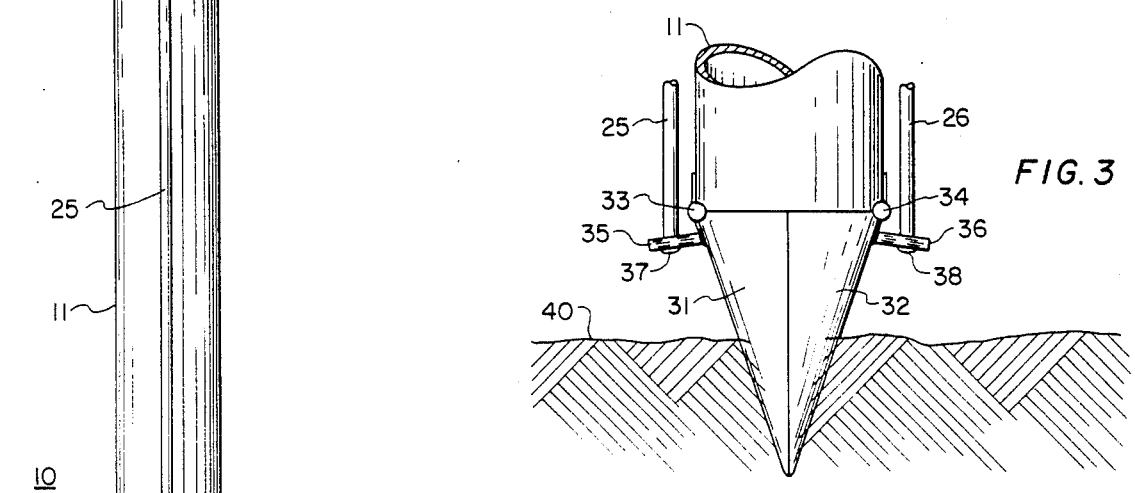
FIG. 3 shows an enlarged, front view of the lower portion of the planter closed with the upper handle as rest.
Figure 4:
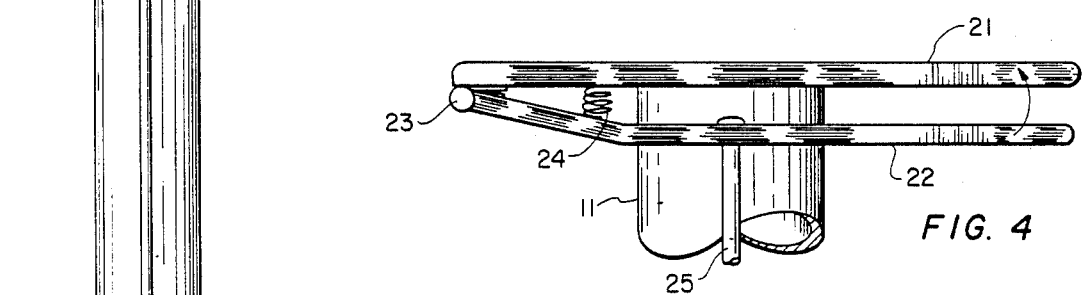
FIG. 4 shows an enlarged, side view of the upper handle portion of the planter compressed.

When the movable handle part 22 is squeezed up against the rigid handle part 21, as seen in FIG. 4, with similar elements, again, similarly numbered, the squeezing, or drawing together of the handle parts draws up the rod 25, as well as rod 26 seen in FIGS. 3 and 5, to pull apart—or open—the conical sections, as seen in FIG. 5.

FIG. 3 shows an enlarged front view of the lower, conical portion of the planter closed for penetration into the earth 40. The conical portion includes a first conical section 31, hinged at 33 to the tubular body 11. A lever arm 35, bonded to the conical section, is attached to the control rod 25, by a nut or similar device 37, to open and close the planting device. The lower conical portion, shown here, also has an opposing second conical section 32, with its lever arm 36 attached to its control rod 26 by the nut or fastener 38, identical to that of the first half, to, simultaneously, open and close this half of the planting device.

FIG. 4 as noted earlier shows the movable handle part 22 squeezed up or compressed towards the rigid handle part 21 to draw the rods, such as 25 up with respect to the tubular body 11. This spreads or opens the lower conical sections as shown in FIG. 5.

FIG. 5 shows another enlarged view of the lower conical portion with the conical sections 31 and 32 pulled open by the compression of the movable handle part 22, as seen in FIG. 4, and, again, similar elements are similarly numbered. Here the control rods 25 and 26 have pulled up the lever arms 35 and 36 of the conical sections 31 and 32 to open the ground 40.

Here a typical seed 41 is shown in the ground. It may have been dropped down through the tubular body after the conical sections have been pulled open, or released when they are opened.

The hollow tubular body 11 also permits the introduction of water 42 directly to the seed—rather than to the ground in the vicinity of the seed at a later time, as is usually done—and it also permits the addition of fertilizer or humus, such as 43 directly to the seed to materially aid in its growth.

Here, it should be noted, in times of water shortages, and expensive fertilizers, that minimal amounts of water and fertilizer may be used, since they are applied directly to the seed, and in minimal, measured amounts, rather that being applied later, in the vicinity of the seeds, and in very, very much larger quantities, to try to have at least the minimal amounts of water and fertilizer reach the seeds.

The tubular body may be of any convenient size for the addition of the desired seeds and other materials. Larger or smaller units would handle correspondingly larger or smaller seed and fertilizing situations, and would, of course, change the size and weight of the unit.

A larger diameter tubular body could be desirable for another function of this unit, which is the transplanting of seedlings. This is one of the most tedius of gardening chores. However, this unit, or a relatively-larger version of this unit, can, when open, encompass a seedling, pick it up, and transfer it to another location, and into another hole that may be pre-punched or dug out by the same unit beforehand.

Other types of handles, with other types of movable elements, can be adapted to the elongated tubular body, and other types of ground-penetrating portions will also be adaptable to this concept. For example, a single-hinged conical section, on one side of the lower end of the tubular body, would be almost as effective, and comparatively simpler.

I claim:

1. A seed planter for gardening from an upright position comprising an elongated, hollow, tubular body having an open upper end and a lower end; means for closing said lower end; said means for closing said lower end being pointed for insertion into the ground; said means for closing said lower end having at least one movable portion controlled by a lever rigidly mounted on said portion, said portion being hinged to open said lower end when said lever is moved; a handle means having a rigid part secured around the opening, and including a grasping portion extending to one side of said opening and not obstructing said opening, at said upper end; said handle having a movable part pivoted on said rigid part, extending to said one side from the opposite side beneath said rigid part and not obstructing said opening, to be squeezed by hand; means connecting said movable handle part to said lever on said movable portion of said means for closing said lower end to maintain said means for closing in a normally closed portion and for opening said lower end of said tubular body when said movable handle is squeezed, to spread open said ground pierced by said pointed end to permit the dropping of a given seed through said opening at said upper end and through said hollow tubular body, for planting, along with water to start germination, and other materials to nourish said seed.

2. A seed planter as in claim 1 wherein said means for closing said lower end has two opposing movable portions hinged to said tubular section, and each of said movable portions is connected to said movable handle to spread the ground pierced by said pointed ends for planting said seed.

3. A seed planter as in claim 2 wherein said movable handle extends to either side of said tubular section, and has rods extending down to either side of said movable portions to open them when said handle is squeezed.

* * * * *